United States Patent
Tsai

(10) Patent No.: US 7,076,585 B2
(45) Date of Patent: Jul. 11, 2006

(54) SYSTEM BUS CONTROLLER AND THE METHOD THEREOF

(75) Inventor: Chih-Ming Tsai, Taipei Hsien (TW)

(73) Assignee: ICP Electronics Inc., Shi-Chih (TW)

( * ) Notice: Subject to any disclaimer, the term of this patent is extended or adjusted under 35 U.S.C. 154(b) by 291 days.

(21) Appl. No.: 10/708,274

(22) Filed: Feb. 20, 2004

(65) Prior Publication Data

US 2004/0225767 A1    Nov. 11, 2004

(30) Foreign Application Priority Data

May 9, 2003    (TW)    ................. 92112749 A

(51) Int. Cl.
*G06F 13/00*    (2006.01)
(52) U.S. Cl. ...................... 710/110; 710/107
(58) Field of Classification Search ................ 710/110, 710/46, 107, 305, 100, 310, 52, 105, 220, 710/260; 712/31, 36, 225, 208; 711/100, 711/105; 370/229, 465; 700/3, 11, 33; 709/208, 709/253
See application file for complete search history.

(56) References Cited

U.S. PATENT DOCUMENTS 4,015,243 A * 3/1977 Kurpanek et al. .......... 710/107
4,047,158 A * 9/1977 Jennings ....................... 710/46
4,868,735 A * 9/1989 Moller et al. ................ 712/234
4,920,480 A * 4/1990 Murakami et al. ............ 712/36
5,778,413 A * 7/1998 Stevens et al. ................ 711/5
6,279,103 B1* 8/2001 Warren ........................ 712/227

OTHER PUBLICATIONS

"1003.1 standard for information technology—portable operating systeminterface (posix) system interfaces, issue 6" (abstract only) Publication Date: 2001.*

* cited by examiner

*Primary Examiner*—Gopal C. Ray
(74) *Attorney, Agent, or Firm*—Winston Hsu

(57) ABSTRACT

A system bus controller for a computer system and a related method are introduced. The computer system has at least a bus and a bus master electrically connected to the bus. The system bus controller includes a bus slave interface, a master queue, a bus master interface, a queue entries executor and a master queue management unit. Initially, any entry command transmitted over the bus by the bus master will be sequentially queued in a memory. Then, a corresponding acknowledge signal to release access of the bus is generated by the queue management unit. Then, the queued entry commands are sequentially executed to generate corresponding results, which will be caught by the bus master in an active or passive manner.

15 Claims, 7 Drawing Sheets

SYSTEM BUS CONTROLLER AND THE METHOD THEREOF

BACKGROUND OF INVENTION

1. Field of the Invention

The present invention relates to a system bus controller and related method, and more specifically, to a system bus controller and related method for efficiently managing the bus transaction in a computer system.

2. Description of the Prior Art

Generally, a bus is a channel for transmitting entry commands and data in a computer system and providing bus transactions between devices in the computer system. Referring to FIG. 1, a prior art computer system 10 comprises a bus 12, as first bus master 14, a second bus master 16, a first bus slave 18, and a second slave 20. The first bus master 14, the second bus master 16, the first bus slave 18, and the second bus slave 20 are electrically connected to the bus 12. The above-mentioned first bus master 14 and the second bus master 16 are connected to a central processing unit (CPU) or a microprocessor control unit (MCU) that transmits and receives entry commands and execute received entry commands. The first bus slave 18 and the second bus slave 20 are connected to an I/O device to receive entry commands and execute received entry commands.

When the first bus master 14 (or second bus master 16) receives control of the bus 12 and then transmits entry commands to the first slave 18 (or second slave 20) through the bus 12, the first bus master 14 waits and occupies the bus 12 until the entry commands are executed by the first bus slave 14 and an acknowledge signal and a response signal are transmitted to the first bus master 14 through the bus 12. That the first bus master 14 occupies the bus 12 is dependent on the type of the bus 12. In addition, the first bus master 14 reinstates a stand-by mode to execute a next entry command. This means that in the period that the first bus master 14 is waiting for the acknowledge signal and the response signal transmitted by the first bus slave, the first bus master 14 is not capable of transmitting any entry commands to the first bus slave 18 through the bus 12, or the first bus master 14 and the second bus master 16 are not capable of transmitting any entry commands to the first bus slave 18 and the second bus slave 20 through the bus 12. When the speed that an entry command is executed by the first bus slave is quite slow, the efficiency of the computer system 10 is also reduced. This disadvantage is significant when the computer system is performing processing that requires high speed.

SUMMARY OF INVENTION

It is therefore a primary objective of the claimed invention to provide a system bus controller and related method such that the operation speed of the bus in a computer system is not restricted by the speed of operation of the bus master or the bus slave to solve the above problems.

According to a preferred embodiment of the claimed invention, a computer system includes at least a bus and bus master electrically connected to the bus. The method comprises: (a) receiving an entry command transmitted by the bus master via the bus; (b) sequentially queuing every entry command transmitted from the bus master to a memory; (c) replying with a corresponding acknowledge signal to the bus master through the bus, according to sequential store of each queued entry command in the memory; (d) the bus master outputting a control signal to release access of the bus and returning to be in a standby mode as soon as receiving each said acknowledge signal; (e) generating a corresponding executing result by way of sequential implementation of each queued entry command stored in the memory; and (f) enabling the bus master to catch each executing result generated in said step (e).

Because the system bus controller is capable of storing each entry command in the memory and replying with the acknowledge signal of the bus to the bus master to make the bus master reinstate the stand-by mode, the bus master is capable of implementing other operations. When the entry commands are executed, the system bus controller actively transmits the executing result to the bus master, or the system bus controller notifies the bus master to catch the executing result of the entry command so that the speed of operation does not affect the operation efficiency of the computer system.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
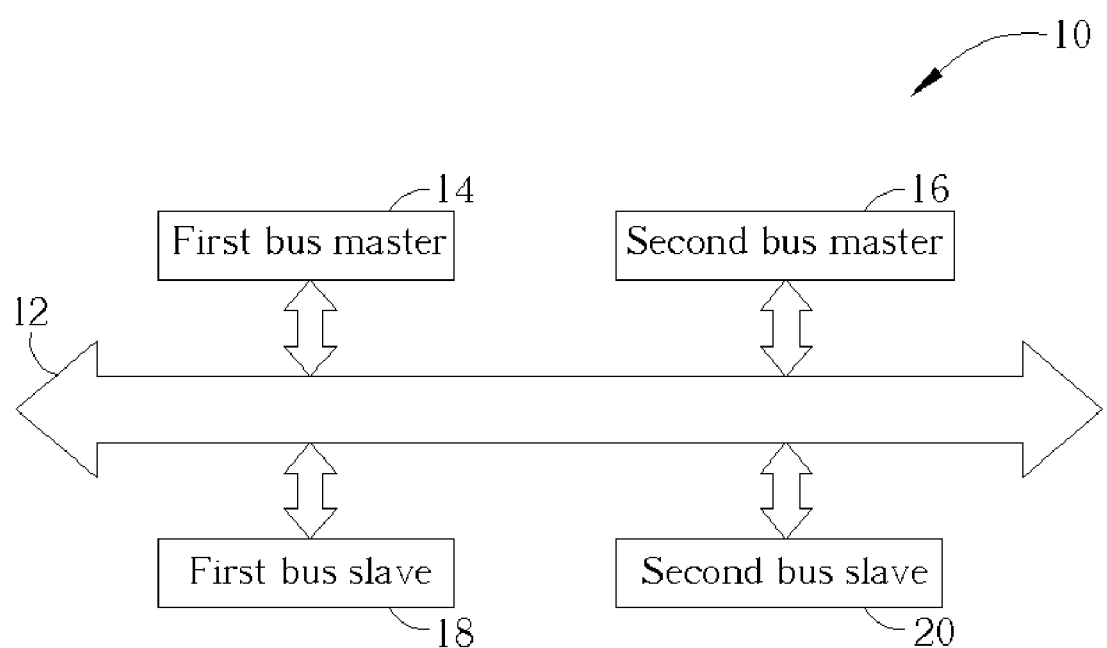
FIG. 1 is a schematic diagram of a computer system according to the prior art.
Figure 2:
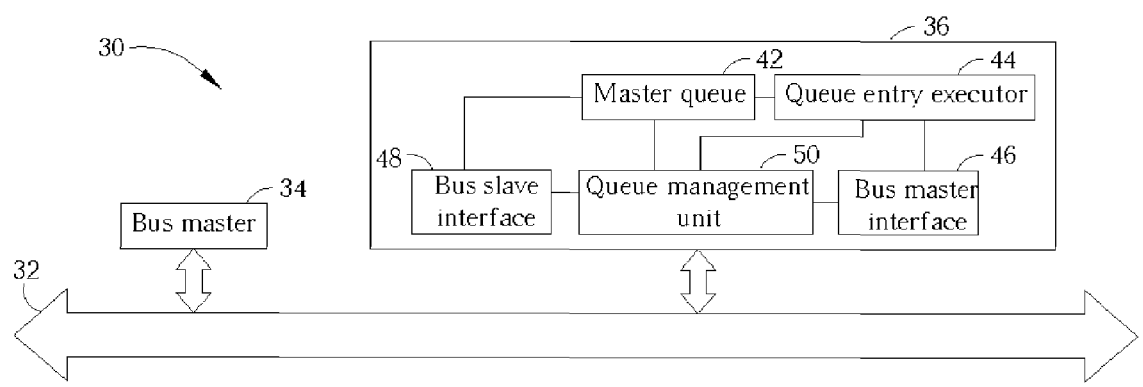
FIG. 2 is a block diagram of a computer system according to a first embodiment of the present invention.

Please refer to FIG. 2. FIG. 2 is a block diagram of a computer system 30 according to a first embodiment of the present invention. The computer system 30 comprises a bus 32 used for transmitting and receiving entry commands and data, a bus master 34, and a system bus controller 36 electrically connected to the bus 32.

So that the computer system has better efficiency, the above-mentioned bus 32 is a point-to-point interconnect bus. In the other words, the bus 32 is capable of providing a plurality of entry commands/data channels to allow a plurality of bus masters to transmit entry commands and data to each other. The bus 32 is an ISA (industry standard architecture), EISA(extended industry standard architecture), or PCI(peripheral component interconnect) bus, for example. The bus master 34 corresponding to the above-mentioned bus 32 is a device such as a CPU (central processing unit). The system bus controller is in an I/O device capable of responding actively when receiving entry commands transmitted from the bus master 34. The source of the bus 32 and the bus master 34 is not necessary required to wait for the signal indicating that an entry command is executed.

The point-to-point interconnect bus has at least a work-management circuit, a so called the arbiter (AR), for managing the entry commands/data channel of the first bus master. The operating processing is described as follows. The bus master 34 should transmit a corresponding request signal (RWQ#) to the bus arbiter (AR) in the bus 32 before the bus master 34 transmits the entry commands/data to the system bus controller 36. After that, the arbiter (AR) determines the priority of the request signal (REQ#), then, the arbiter (AR) outputs a grant signal (GNT#) to allow the transaction of the bus master 34 and the system bus controller 36 so that the entry commands/data channel is allotted to the bus master 34. Finally, the bus master 34 transmits the entry commands/data to the system bus controller 36 through the entry commands/data channels.

In the computer system 30 shown in FIG. 2, the system bus controller 36 comprises a master queue 42 used with the memory for storing a plurality of entry commands transmitted from the bus master 34, a queue entries executor 44 for sequentially executing the entry commands, a bus master interface 46 electrically connected to the bus 32 and for actively outputting the executing result that is generated by the queue entries executor 44 after the entry commands are executed by the queue entries executor 44, a bus slave master interface 48 electrically connected to the bus 32 and for receiving the entry commands transmitted from the bus 32, and a queue management unit 50 for managing the operation of the master queue 42.

According to the above-mentioned design of the bus master interface 46 and bus slave interface, the system bus controller 36 is capable of playing the roles of the bus master and the bus slave. The system bus controller 36 does not only receive the entry commands/data transmitted from the other bus master through the bus 32, but transmits the executing result after the entry commands/data are executed. Each above-mentioned entry command/datum transmitted from the bus master 34 through the bus 32 comprises the following parameters: source address, target address, access type, count number, and extra information.

When the above-mentioned bus slave interface 48 receives the entry commands/data transmitted by the bus 32, the queue management unit queues the parameters of each entry command/datum in the master queue 42 sequentially. The queue management unit replies with a acknowledge signal (ACK) to the bus master 34 to cause the bus master 34 reinstate a stand-by mode. The source of the bus 32 and the bus master 34 should be occupied until the entry command is executed. The above-mentioned master queue 42 can be realized by a buffer in a dynamic random access memory (DRAM). The queue management unit 50 comprises a firmware program stored in an electrically erasable programmable read only memory, and/or a memory controller interface.

The queue entries executor 44 can be realized by a firmware program, a microprocessor control unit (MCU), or a direct memory access unit (DMA). The queue management unit 50 fetches the parameters of each entry command stored into the master queue 42 to execute the entry command. When the entry command is executed, the queue entry executor 44 operates a bus transaction in the bus master interface 46 through the queue management unit 50 to answer the bus master 34.

Figure 3:
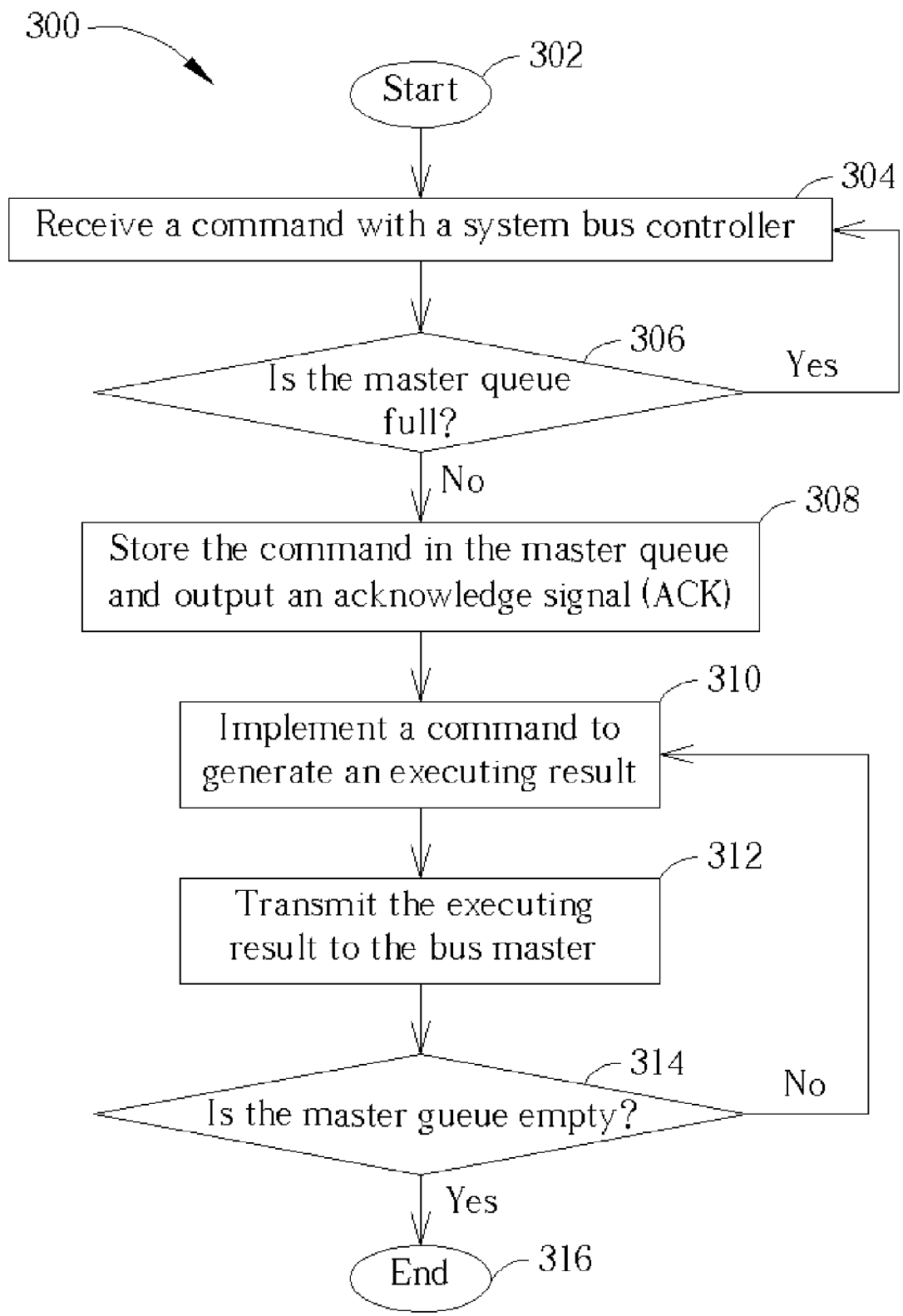
FIG. 3 is a flowchart for managing the computer system of FIG. 2.

Please refer to FIG. 3. FIG. 3 is a flowchart of a system bus controller and related method 300. The bus master 34 gets the grant of the arbiter in the bus 32 and is capable of transmitting data to the system bus controller 36. The method 300 comprises the following steps:

Step 302: Start. The bus master 34 transmits the entry commands/data to the system bus controller 36 via the bus 32;

Step 304: The system bus controller 36 receives the entry commands/data transmitted from the bus master 34 through the bus slave interface 48. Each entry command outputted by the bus master 34 comprises data fields of: source address, target address, access type, and extra information. For example, the source address field in the entry command stores the IP related to the bus master 34, and the target address field stores the IP related to the system bus controller 36;

Step 306: The queue management unit 50 determines whether there is sufficient space for storing the entry commands in the master queue 42. If there is space for storing the entry commands into the master queue 42, step 308 is implemented. If there is space remaining for storing the entry commands into the master queue 42, step 304 is implemented. If the queue management unit 50 determines that there is no space for storing the entry commands into the master queue 42, the queue management unit 50 waits for the master queue 42 until that there is sufficient space for storing the entry commands into the master queue 42. And then, the queue management unit 50 stores the entry commands into the master queue 42 through the bus slave interface 48 sequentially. Avoiding the above-mentioned waiting state, the space for storing the entry commands into the master queue 42 in the system bus controller 36 can be adjusted according to the operation condition of system bus controller 50. In the other words, when the speed that the entry commands are received by the system bus controller exceeds the speed that the queue entries executor 44 executes the entry commands, the system bus controller 36 needs to include more queue for storing the entry commands;

Step 308: The queue management unit 50 in the system bus controller 36 pushes the entry commands from the bus slave interface 48 to the master queue 42 and replies with an acknowledge signal (ACK) to release the entry commands/data channel making the bus master reinstates the stand-by mode. After pushing the entry commands to the master queue 42, the queue management unit 50 updates the pointer of the master queue 42. The action of updating the pointer is well known to those skilled in the art and further details are omitted;

Step 310: The queue entries executor 44 in the system bus controller 36 queued outputs the entry commands pushed into the master queue 42. For example, an entry command is output and executed according to the data stored in each field of the entry command and an executing result is generated. After the entry command is output from the master queue 42, the queue management unit 50 updates the pointer of the master queue 42;

Step 312: The queue management unit 50 in the system bus controller 36 transmits the executing result that is generated by the queue entries executor 44 after the queue entries executor 44 executes the entry commands to the bus master interface 48, and then, the executing result is transmitted to the bus master 34. The executing result is queued in the other command fields (e.g.: source address, target address, and so on) of the bus master 42;

Step 314: The queue management unit 50 in the system bus controller 36 determines whether the bus master 42 stores entry commands that are not executed by the queue entries executor 44. When the bus master 42 stores entry commands that are not executed by the queue entries executor 44, step 310 is implemented. When the bus master 42 does not store entry commands that are not executed by the queue entries executor 44, step 316 is implemented;

Step 316: End.

Figure 4:
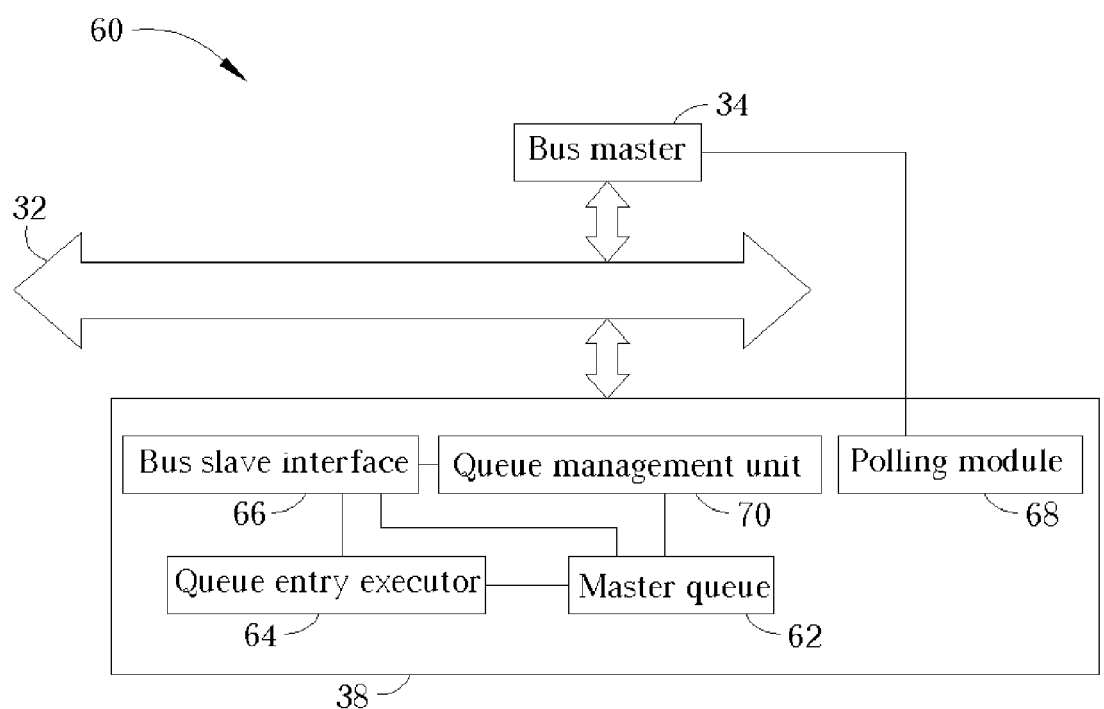
FIG. 4 is a block diagram of a computer system according to a second embodiment of the present invention.

Please refer to FIG. 4. FIG. 4 is a block diagram of a computer system 60 according to a second embodiment of the present invention. The computer system 60 comprises the bus 32, bus master 34, and a system bus controller 38. The system bus controller 38 of the second embodiment, and the system bus controller 36 of the first embodiment both comprise the a master queue 62, a queue management unit 70, and a queue entries executor 64. The difference between the system bus controller 38 in the second embodiment and that of the first embodiment is that the system bus controller 36 of the first embodiment has both the bus master interface and bus slave interface and the system bus controller 38 of the second embodiment only has the bus slave interface 66. The system bus controller 38 only receives and executes the entry commands transmitted from other bus masters, and does not output the executing result in an active manner, and thus, it is necessary to use a polling module 68.

The polling module 68 in the above-mentioned system bus controller 38 includes a (detection) polling program loaded into RAM when the computer is initializing, or a firmware program stored in a ROM. For example, when the bus master 34 is a CPU (central processing unit) of a computer, the polling module 68 realized as a part of the initializing software/firmware program of the computer. When the computer is booting, the computer can load the polling module 68, which is capable of polling whether a flag value is in the specific address in which the executing result is stored to determine whether the executing result corresponding to a entry command is generated by the queue entries executor 62.

Figure 5:
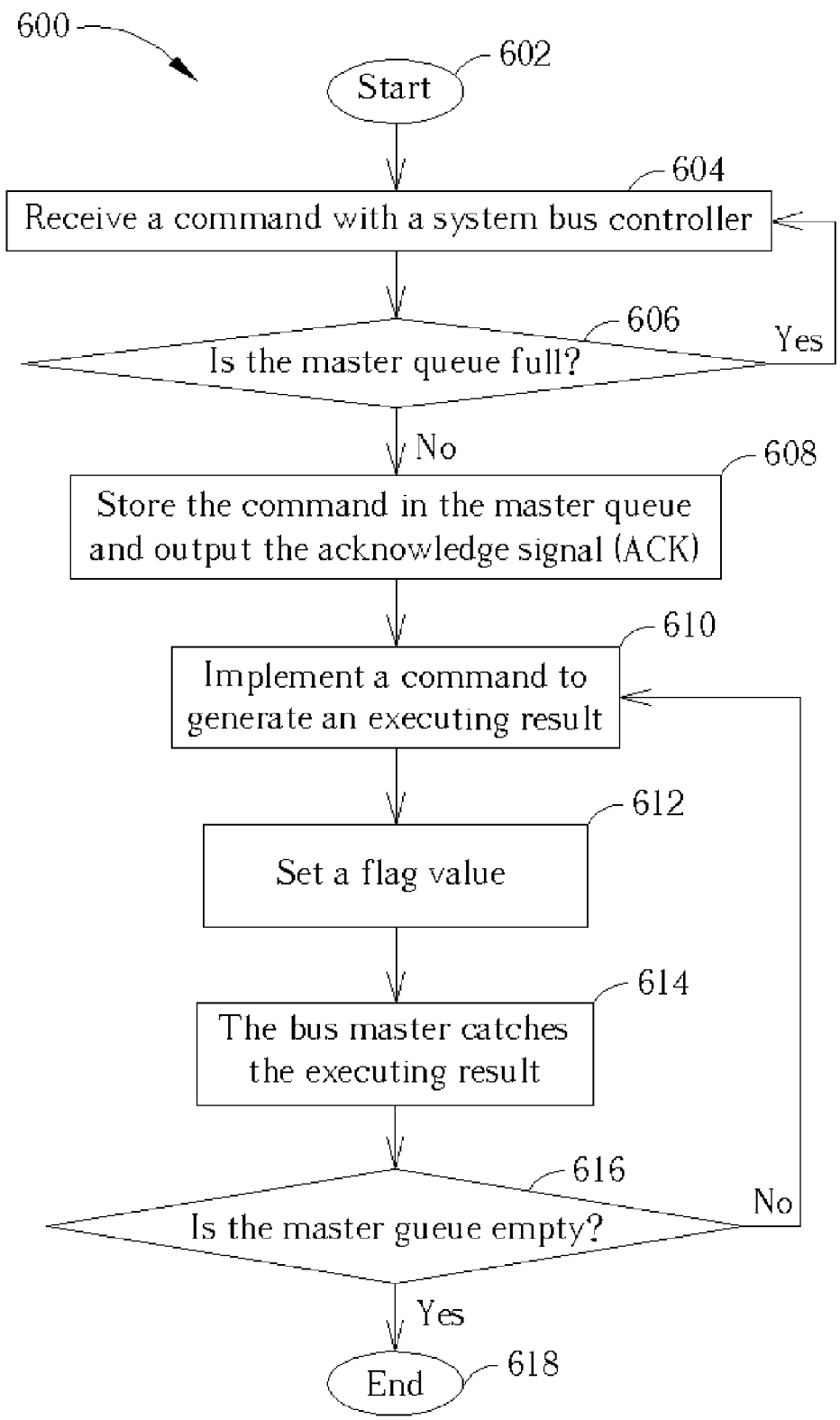
FIG. 5 is a flowchart for managing the computer system of FIG. 4.

Please refer to FIG. 5. FIG. 5 is a flowchart 600 for managing the computer system shown in FIG. 4.

Step 602: Start. The bus master 34 transmits the entry commands/data to the system bus controller 36 via the bus 32;

Step 604: The system bus controller 38 receives the entry commands/data transmitted from the bus master 34 via the bus slave interface 66;

Step 606: The queue management unit 70 of the system bus controller 38 determines whether there is sufficient remaining space for storing the entry commands into the master queue 62. When there is space for storing the entry commands into the master queue 62, step 608 is implemented. When there is no space remaining for storing the entry commands into the master queue 62, step 604 is implemented. If the queue management unit 70 determines that there is not enough space for storing the entry commands into the master queue 62, the queue management unit 70 waits for the master queue 62 until there is space for storing the entry commands into the master queue 62. Then, the queue management unit 70 stores the entry commands into the master queue 62 through the bus slave interface 66 sequentially. Avoiding the above-mentioned waiting state, the space for storing the entry commands into the master queue 62 in the system bus controller 38 is capable of being adjusted according to the operation condition of the system bus controller;

Step 608: The queue management unit 70 in the system bus controller 38 receives an entry command from the bus slave interface 66 and pushes the entry command into the master queue 62 and replies with an acknowledge signal (ACK) to release the entry commands/data channel making the bus master 34 reinstate the stand-by mode. After pushing the entry commands to the master queue 62, the queue management unit 70 updates the pointer of the master queue 62;

Step 610: The queue entries executor 64 in the system bus controller 38 queued outputs the entry commands pushed in the master queue 62 to generate an executing result corresponding to the entry command. After the entry command is output from the master queue 62, the queue management unit 70 updates the pointer of the master queue 62;

Step 612: The queue management unit 70 in the system bus controller 38 sets a flag value at a specific address defined within the master queue 62 to represent that the queue entries executor unit 64 has generated a executing result when the queue entries executor 64 generates the executing result corresponding to the entry command. Because the system bus controller 38 is a slave device, the system bus controller 38 cannot transmit the executing result of the queue entries executor 44 to the bus master 34 in an active manner. The system bus controller 38 should wait for the master device bus master 34 to catch the executing result corresponding to the entry command in a polling manner;

Step 614: The polling module 68 detects periodically whether there is a flag value in the master queue 62 of the system bus controller 38 to enable the bus master 34 to catch the executing result through the bus 32;

Step 616: The queue management unit 70 in the system bus controller 38 determines whether the bus master 62 stores entry commands that are not executed by the queue entries executor 64. When the bus master 62 stores entry commands that are not executed by the queue entries executor 64, step 610 is implemented. When the bus master 62 does not store entry commands that are not executed by the queue entries executor 64, step 618 is implemented;

Step 618: End.

Figure 6:
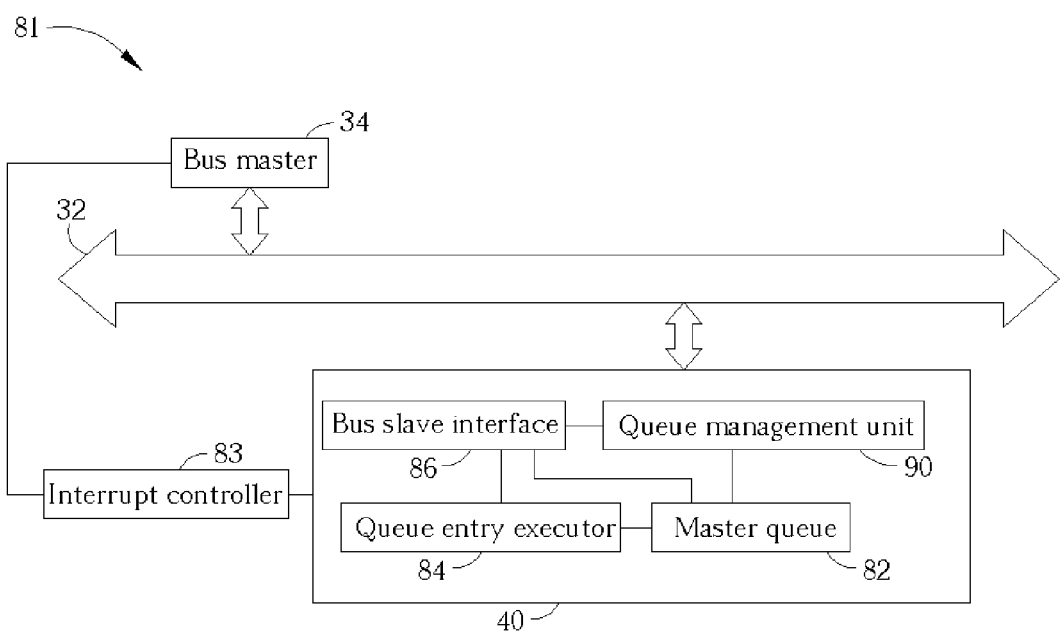
FIG. 6 is a block diagram of a computer system according to a third embodiment of the present invention.

Please refer to FIG. 6. FIG. 6 is a block diagram of a computer system 81 according to a third embodiment of the present invention. The computer system 81 comprises the bus 32, bus master 34, and a system bus controller 40. The system bus controller 36 of the first embodiment, the system bus controller 38 of the second embodiment, and the system bus controller 40 of the third embodiment all comprise a master queue 82, a queue management unit 90 and a queue entries executor 84. The difference between the system bus controller 36 of the first embodiment and the system bus controller 40 of the second embodiment is that the system bus controller 36 of the first embodiment has both a bus master interface and a bus slave interface and the system bus controller 40 of the third embodiment only has the bus slave interface 86. The system bus controller 40 in the third embodiment is similar to the system bus controller 38 in the second embodiment. The system bus controller 40 only receives and executes entry commands transmitted from other bus masters, and does not output the executing result in an active manner, and so, it is necessary to use an interrupt controller 83.

After the above-mentioned the queue entries executor 84 in the system bus controller 40 generates a executing result corresponding to a entry command, the queue entries executor 84 puts the executing result in a specific address defined within the master queue 82 through the queue management unit 90 to generate a register through the queue management unit 90. The register causes the voltage change of a pin electrically connected to the interrupt controller 83 to trigger the interrupt controller 83 to out-put an interrupt signal to the bus master 34. When the bus master 34 is triggered by the interrupt signal, the bus master starts to catch the executing result generated by the queue entries executor 84.

Figure 7:
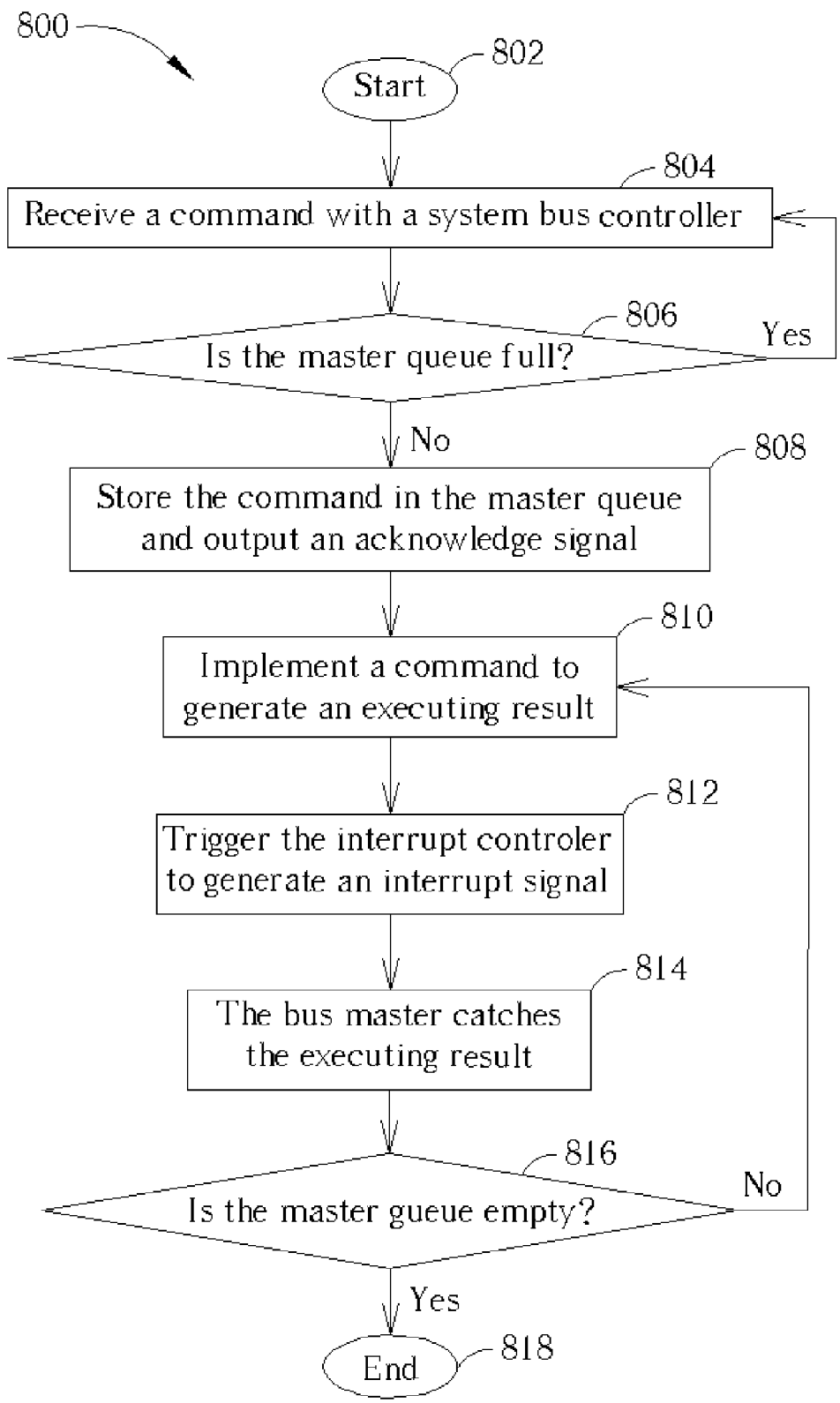
FIG. 7 is a flowchart for managing the computer system of FIG. 6.

Please refer to the FIG. 7. FIG. 7 is a flowchart 800 for managing the computer system display in the FIG. 7. The method comprising the following steps:

Step 802: Start. The bus master 34 transmits entry commands/data to the system bus controller 40 through the bus 32;

Step 804: The system bus controller 40 receives the entry commands/data transmitted from the bus master 34 through the bus slave interface 86;

Step 806: The queue management unit 90 of the system bus controller 40 determines whether there is sufficient remaining space for storing the entry commands into the master queue 82. When there is space for storing the entry commands into the master queue 82, step 808 is implemented. When there is no remaining space for storing the entry commands into the master queue 82, step 804 is implemented. If the queue management unit 90 determines that there is no space for storing the entry commands into the master queue 82, the queue management unit 90 waits for the master queue 82 until there is space for storing the entry commands into the master queue 82. Then, the queue management unit 90 stores the entry commands into the master queue 82 through the bus slave interface 86 sequentially. Avoiding the above-mentioned waiting state, the space for storing the entry commands into the master queue 82 in the system bus controller 40 can be adjusted according to the operation condition of the system bus controller;

Step 808: The queue management unit 90 in the system bus controller 40 receives an entry command from the bus slave interface 86 and pushes the entry command in the master queue 82, and replies with an acknowledge signal (ACK) to release the entry commands/data channel making the bus master 34 reinstate the stand-by mode. After pushing the entry commands to the master queue 82, the queue management unit 90 updates the pointer of the master queue 82;

Step 810: The queue entries executor 84 in the system bus controller 40 queued outputs the entry commands pushed in the master queue 82 to generate an executing result corresponding to the entry command. After the entry command is output from the master queue 82, the queue management unit 90 updates the pointer of the master queue 82;

Step 812: After the queue entries executor 84 in the system bus controller 40 generates an executing result corresponding to a entry command, the queue entries executor 84 puts the executing result in a specific address defined within the master queue 82 through the queue management unit 90 to generate a register through the queue management unit 90. The register causes a voltage change of the pin electrically connected to the interrupt controller 83 to trigger the interrupt controller 83 to out-put an interrupt signal to the bus master 34. Because the system bus controller 40 in the third embodiment of the present invention is also a slave device (it is only a slave interface 86), the system bus controller 40 should enable the master device-bus master 34 in the computer system 81 by way of an interrupt to catch the executing result corresponding to the above-mentioned entry command;

Step 814: When the bus master 34 receives the interrupt signal, the bus master catches the executing result via the bus 32. The interrupt controller 83 interrupts the executing operation and catches the executing result corresponding to the entry command generated by the queue entries executor 84 through the bus 32;

Step 816: The queue management unit 90 in the system bus controller 40 determines whether the master queue 82 is empty. This means that the queue management unit 90 in the system bus controller 40 determines whether there are no entry commands executed by the queue entries executor 84 in the master queue 82. When there are no entry commands executed by the queue entries executor 84 in the master queue 82, step 818 is implemented. When there are entry commands executed by the queue entries executor 84 in the master queue 82, step 810 is implemented;

Step 818: End.

Compared to the prior art, the system bus controller 36 of the first embodiment, the system bus controller 38 of the second embodiment, and the system bus controller 40 of the third embodiment are capable of pushing each entry command sequentially into the master queue 34 through a queue management unit when receiving entry commands through the bus 32. Then, the system bus controller 36, 36, 40 replies with an acknowledge signal (ACK) releasing the channel of the bus 32 to the bus master 34 to make the bus master 34 reinstate a stand-by mode. The bus master 34 is capable of executing other operations. After the entry commands are executed, the system bus controller 36 transmits the executing result to the bus master 34, or the system bus controller 38 and 40 notifies the bus master 34 to catch the executing result so that the operation speed does not affect the operation efficiency of the computer system 30, 60 and 81 when the entry commands are executed.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for controlling a system bus for a computer system, the computer system comprising a bus master electrically connected to the bus, the method comprising:
    (a) receiving an entry command transmitted by the bus master via the bus;
    (b) sequentially queuing every entry command transmitted from the bus master to a memory;
    (c) replying with a corresponding acknowledge signal to the bus master through the bus, according to sequential store of each queued entry command in the memory;
    (d) the bus master outputting a control signal to release access of the bus and returning to be in a stand-by mode as soon as receiving each said acknowledge signal;
    (e) generating a corresponding executing result by way of sequential implementation of each queued entry command stored in the memory; and
    (f) enabling the bus master to catch each executing result generated in said step (e).

2. The method of claim 1 wherein the computer system further comprises a system bus controller.

3. The method of claim 2 wherein the system bus controller comprises:
    a bus slave interface connected to the bus for receiving the entry command transmitted from the bus master;
    a master queue used with the memory for storing each queued entry command in step (b)
    a queue entries executor for sequentially implementing each queued entry command stored in said master queue in step (e) to generate a corresponding executing result; and
    a queue management unit for managing queue and up date of each entry command in the master queue and transmission of the acknowledge signal in the step (c).

4. The method of claim 3 wherein the system bus controller further comprises a bus master interface electrically connected to the bus, for actively outputting the executing result of step (e) to the bus master.

5. The method of claim 3 wherein each executing result in response to each queued entry command is capable of being further queued in a specific address defined within the master queue.

6. The method of claim 5 wherein the system bus controller further comprises:
a polling module for periodically detecting whether there is any executing result found in the master queue, with response to each queued command, so as to enable the bus master to catch the existing executing result.

7. The method of claim 5 wherein the system bus controller further comprises:
an interrupt controller electrically connected to the queue management unit, which is triggered to enable the bus master to catch an executing result, by means that the queue management unit stores the executing result into the master queue.

8. The method of claim 1 wherein step (f) further comprises: periodically detecting whether there is any executing result corresponding to the entry command is generated thereby enabling the bus master to catch the executing result.

9. The method of claim 1 wherein step (f) further comprises:
after generating each executing result corresponding to the entry command, correspondingly generating and transmitting an interrupt control signal to the bus master thereby enabling the bus master to catch the executing result.

10. A system bus controller suitable for a computer system having a bus and a bus master electrically connected to the bus, the system bus controller comprising:
a bus slave interface electrically connected to the bus and receiving each entry command transmitted from the bus master through the bus;
a master queue capable of storing the entry commands received by the bus slave interface;
a queue entries executor capable of executing the entry commands stored in the master queue thereby generating a corresponding executing result;
a bus master interface electrically connected to the bus and outputting the executing result generated by the queue entries executor; and
a queue management unit, respectively connected to the bus master interface, the bus slave interface, the queue entries executor and the master queue, being capable of managing the queue of all entry commands in the master queue and outputting a acknowledge signal to the bus master with regard to each received entry command.

11. The system bus controller of claim 10 wherein the master queue is allocated in a dynamic random access memory.

12. A system bus controller of a computer system having a bus and a bus master electrically connected to the bus, the system bus controller comprising:
a bus slave interface electrically connected to the bus, being capable of receiving each entry command transmitted from the bus master through the bus;
a master queue for storing therein entry commands received by the bus slave interface;
a queue entries executor for executing the entry commands stored in the master queue to generate a corresponding executing result;
a queue management unit, respectively connected to the bus master interface, the bus slave interface, the queue entries executor and the master queue, being capable of managing the queue of each entry command in the master queue and outputting an acknowledge signal to the bus master, with regard to the each received command, thereby facilitating return of the bus master to be in a stand-by mode; and
a device capable of outputting a signal to enable the bus master to catch the corresponding executing result when the executing result generated from the queue entries executor is detected by the device, through the queue management unite.

13. The system bus controller of claim 12 wherein the master queue is allocated in a dynamic random access memory.

14. The system bus controller of claim 12 wherein the device is a polling module that detects whether any executing result exists with regard to the entry command through the queue management unit.

15. The system bus controller of claim 12 wherein the device is an interrupt controller that can be triggered by the queue management unit after an executing result is generated, so as to enable the bus master to catch the executing result.

* * * * *